United States Patent
Coupe et al.

(10) Patent No.: US 6,944,154 B2
(45) Date of Patent: Sep. 13, 2005

(54) SYSTEM AND METHOD FOR REMULTIPLEXING OF A FILTERED TRANSPORT STREAM WITH NEW CONTENT IN REAL-TIME

(75) Inventors: David Coupe, Gex (FR); Eric M. Foster, Owego, NY (US); Bryan J. Lloyd, Vestal, NY (US); Chuck H. Ngai, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 09/730,614

(22) Filed: Dec. 6, 2000

(65) Prior Publication Data

US 2002/0067718 A1 Jun. 6, 2002

(51) Int. Cl.$^7$ .............................................. H04L 12/56
(52) U.S. Cl. ........................ 370/389; 370/487; 370/535
(58) Field of Search ................................ 370/528, 485, 370/486, 487, 493, 505, 535, 389

(56) References Cited

U.S. PATENT DOCUMENTS

| | | | |
|---|---|---|---|
| 5,619,337 A | * 4/1997 | Naimpally ..................... | 386/83 |
| 5,650,825 A | 7/1997 | Naimpally et al. | |
| 5,691,986 A | 11/1997 | Pearlstein | |
| 5,831,690 A | * 11/1998 | Lyons et al. ........... | 375/240.28 |
| 5,844,478 A | 12/1998 | Blatter et al. | |
| 5,966,120 A | * 10/1999 | Arazi et al. .................. | 345/724 |
| 6,002,687 A | 12/1999 | Magee et al. | |
| 6,064,676 A | 5/2000 | Slattery et al. | |
| 6,246,701 B1 | * 6/2001 | Slattery ....................... | 370/503 |
| 6,275,507 B1 | * 8/2001 | Anderson et al. ........... | 370/487 |
| 6,351,471 B1 | * 2/2002 | Robinett et al. ............. | 370/468 |
| 6,351,474 B1 | * 2/2002 | Robinett et al. ............. | 370/486 |
| 6,434,146 B1 | * 8/2002 | Movshovich et al. ....... | 370/394 |
| 6,466,581 B1 | * 10/2002 | Yee et al. .................... | 370/428 |

FOREIGN PATENT DOCUMENTS

| WO | WO 98/16067 | 4/1998 |
|---|---|---|
| WO | WO 99/23830 | 5/1999 |

OTHER PUBLICATIONS

"TSB42AA4/TSB42AB4 (ceLynx)", ITexas Instruments Data Manual, Jun. 2000, pp. 4_11–4_13.

* cited by examiner

*Primary Examiner*—Min Jung
(74) *Attorney, Agent, or Firm*—Scully, Scott, Murphy & Presser; William H. Seinberg, Esq.

(57) ABSTRACT

In a transport stream demultiplexor device receiving an input transport stream comprising a plurality of data packets and including a filter device for removing one or more predetermined packets to form a partial transport stream, a real-time data remultiplexing system and method comprising: a device for detecting presence of a gap in the partial transport stream where predetermined packets have been removed and generating a signal indicating the gap location; a device for directly retrieving packet data having new content from a memory storage device, and storing the retrieved packet data into a staging buffer device for queued storage prior to insertion into the partial transport stream; and, a multiplexor device responsive to the flag for pulling a queued data packet from the staging buffer device and inserting the pulled packet into the gap as the partial transport stream is being transported on a real-time basis. Advantageously, the retrieving device enables concurrent re-filling of the staging buffer as queued data is pulled from the buffer so as to enable remultiplexing of high bandwidth/high data content streams.

18 Claims, 2 Drawing Sheets

SYSTEM AND METHOD FOR REMULTIPLEXING OF A FILTERED TRANSPORT STREAM WITH NEW CONTENT IN REAL-TIME

BACKGROUND OF THE INVENTION

1. Field of the Invention

This invention relates generally to digital delivery systems, especially for digital video and digital audio data, and more specifically, to a transport stream demultiplexor system including real-time packet remultiplexing function.

2. Discussion of the Prior Art

In an MPEG subsystem that receives content in transport stream format, a transport demultiplexor is used to separate the arriving stream into audio, video, and system data streams. The video data is sent to the video decoder, the audio data to the audio decoder, and the system data to system memory for further processing. In a set-top box application, this allows the program selected by the viewer to be separated and played.

Increasingly, there is a need to be able to store selected program(s) to a fixed storage device such as a hard drive for playback in the set-top box. This requires sending all data associated with the program; audio, video, and system data, to memory for subsequent transfer to the hard drive or other device.

Previous disclosed techniques for storing and playing data based on using the PES, or Packetized Elementary Stream, format which allows for efficient content movement is described commonly-owned, co-pending U.S. patent application Ser. Nos. 09/534643 and 09/535069, and in issued U.S. Pat. No. 6,662,329 the contents and disclosure of each of which are incorporated by reference herein.

However, an alternative of interest to system designers is to store the data in its original transport stream format, but filtering out packets that are not related to the program of interest. When doing this, it may be necessary to insert additional packets containing further information into the partial transport stream as it is being stored to allow subsequent playback. In fact, the ability to add information to a stored stream may be generally used to add or modify stream information for a variety of purposes.

Prior art methods for multiplexing "on the fly" require large and complex buffering schemes for the original stream and dedicated processing resources. Another prior art method as described in a data manual to TSB42AA4/TSB42AB4 (ceLynx) Texas Instruments (TI) Data Manual, pp. 4_11–4_13, Jun. 2000, relates to a packet insertion method that implements a fixed size data buffer comprising data that inserts packets in gaps of a transport stream, however, relies on the system microprocessor to write the individual data bytes in the buffer. Thus, the TI device is not capable of inserting multiple continuous packets in the transport stream. The TI system furthermore implements a trial and error approach for inserting packets. That is, the signaling mechanism employed in the TI device detects any gap in the data stream with no guarantee that the detected gap will be able to hold a full packet's worth of data. Thus, if a detected gap in the stream is being filled and there is not enough space for a full packet insertion, then the TI device abandons the insertion as if it never took place.

It would be highly desirable to provide in a digital data transport demultiplexor, a system and method for real-time remultiplexing, i.e., inserting, packets including new content with a filtered transport stream as it is being forwarded to another device on a real-time basis.

It would be further highly desirable to provide in a digital data transport stream demultiplexor, a system and method for inserting in the transport stream multiple continuous packets including new content, in real-time, wherein the packets are retrieved directly from a system memory storage device.

It would additionally be highly desirable to provide a remultiplexing technique for inserting new packets in a transport stream, without requiring large and complex buffering schemes and without using dedicated processing resources, so that remultiplexed program content may be communicated in real-time to a subscriber location for viewing or display.

It would additionally be highly desirable to provide in a real-time remultiplexing device capable of inserting, packets including new content in a filtered transport stream as it is being forwarded to another device on a real-time basis, a mechanism for guaranteeing the presence of available gaps in the filtered stream that are capable of receiving a full length packets.

SUMMARY OF THE INVENTION

It is an object of the present invention to provide in a digital data transport demultiplexor, a system and method for real-time remultiplexing, i.e., inserting, packets including new content with a filtered transport stream as it is being forwarded to another device on a real-time basis.

It is a further object of the present invention to provide in a digital data transport stream demultiplexor, a system and method for inserting in the transport stream multiple continuous packets including new content, in real-time, wherein the packets are retrieved directly from a system memory storage device.

It is another object of the present invention to provide a real-time remultiplexing technique for inserting new packets in a transport stream, without requiring large and complex buffering schemes and without using dedicated processing resources, so that remultiplexed program content may be communicated in real-time to a subscriber location for viewing or display.

It is yet another object of the present invention to provide in a real-time remultiplexing device capable of inserting, packets including new content in a filtered transport stream as it is being forwarded to another device on a real-time basis, a mechanism for guaranteeing the presence of available gaps in the filtered stream that are capable of receiving a full length packets.

According to the invention, there is provided in a transport stream demultiplexor device receiving an input transport stream comprising a plurality of data packets and including a filter device for removing one or more predetermined packets to form a partial transport stream, a real-time data remultiplexing system comprising: a device for detecting presence of a gap in the partial transport stream where predetermined packets have been removed and generating a signal indicating the gap location; a device for directly retrieving packet data having new content from a memory storage device, and storing the retrieved packet data into a staging buffer device for queued storage prior to insertion into the partial transport stream; and, a multiplexor device responsive to the flag for pulling a queued data packet from the staging buffer device and inserting the pulled packet into the gap as the partial transport stream is being transported on a real-time basis. The retrieving device enables concurrent re-filling of the staging buffer as queued data is pulled from the buffer so as to enable re-multiplexing of high bandwidth/high data content streams.

Advantageously, such a system and method is adapted for processing MPEG-2-compliant digital transport streams, however, may be applicable to other types of digital data communications. Moreover, given that the re-multiplexing mechanism is provided with intelligence for enabling automatic retrieval of data contents directly from the system memory, the degree of data movement is reduced, thus enabling re-multiplexing of high bandwidth/ high data content streams.

BRIEF DESCRIPTION OF THE DRAWINGS

Further features, aspects and advantages of the apparatus and methods of the present invention will become better understood with regard to the following description, appended claims, and the accompanying drawing where:

DETAILED DESCRIPTION OF THE PREFERRED EMBODIMENTS

According to the invention, there is provided a technique for inserting, or remultiplexing, packets containing new content with a filtered transport stream as it is being stored to memory for subsequent filing on a fixed storage device. The technique is based on a modification to the existing transport demultiplexor as described in commonly-owned, U.S. Pat. No. 6,275,507 entitled TRANSPORT DEMULTIPLEXOR FOR AN MPEG-2 COMPLIANT DATA STREAM the contents and disclosure of which is incorporated by reference as if fully set forth herein.

Figure 1:
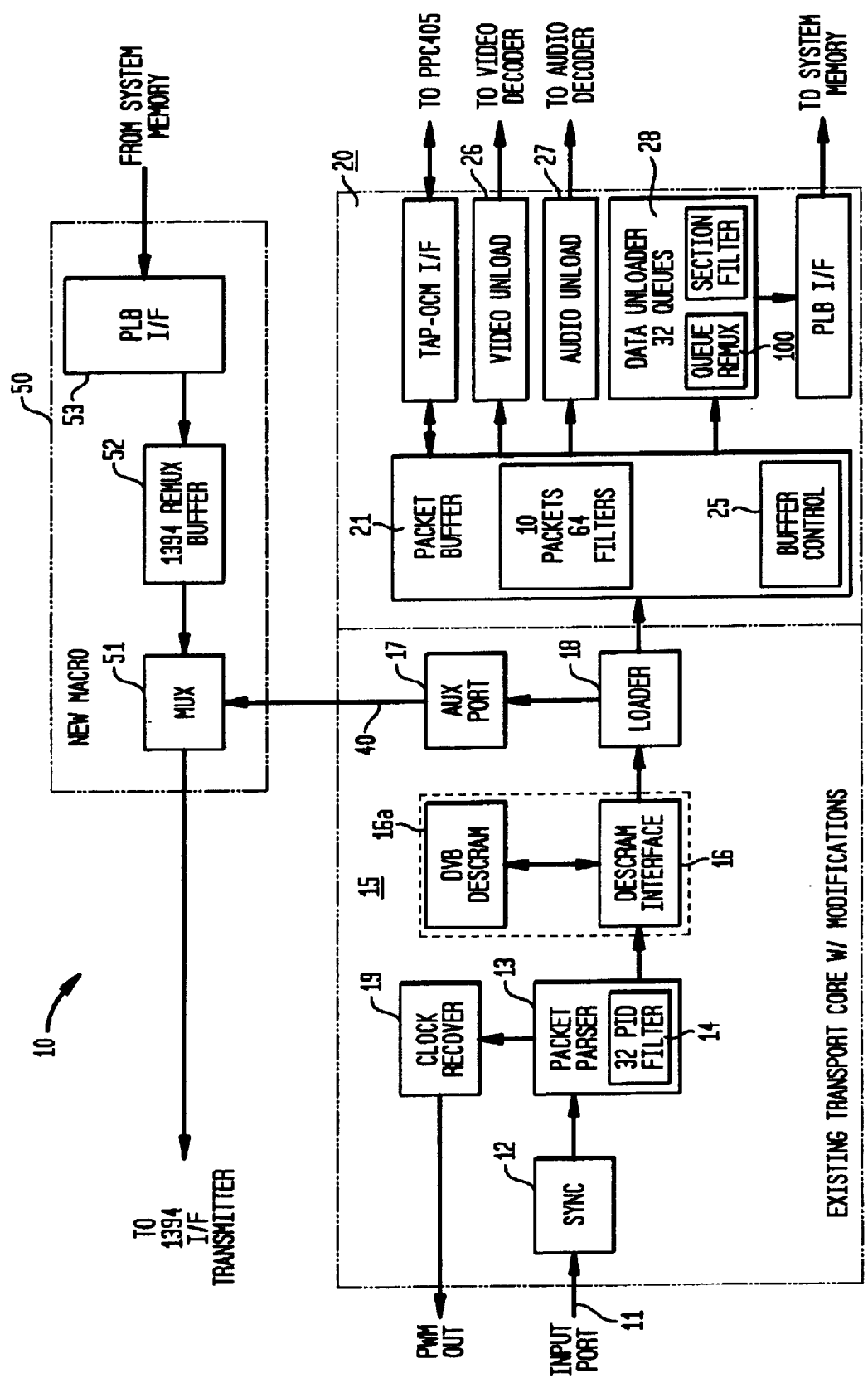
FIG. 1 is a block diagram illustrating the transport demultiplexor 10 adapted for demultiplexing a digital transport stream and including the real-time remultiplexor component according to the invention.

Particularly, the demultiplexor described in U.S. Pat. No. 6,275,507 is a transport demultiplexor that is adapted for demultiplexing an MPEG-2-compliant transport stream into system data streams, a video data stream, and an audio data stream particularly, by extracting program clock references (PCRs) from the data stream and filtering out unnecessary components through the use of Packet Ids (PIDs). As shown in FIG. 1, the transport demultiplexor 10 includes front end logic 15, back-end logic 20, and including a packet buffer 21, control circuit 25, and a data unloader 26, video unloader 27, and audio unloader 28. Generally, the front end logic 15 receives transport stream input packets, and delivers the transport stream packets to the packet buffer 21. The packet buffer 21, in turn, delivers system data to the system data unloader 28, video data to the video unloader 26, and audio data to the audio unloader 27 each of which, as will be explained, asynchronously pull packets out of the packet.

A typical system incorporating the transport demultiplexor of the invention includes a front-end demodulator device (not shown) that converts a received analog signal (e.g., from a satellite broadcast), into a multiplexed digital data (transport) stream which arrives at an input port 11 as 188 byte packets, each packet having a repeating character that may be used for synchronizing packet boundaries. This synchronization is performed by a synchronizer device 12 which receives the 188 byte packet input. Once the packet boundaries are known, the packets are input to the packet parser device 13 which looks at the different data fields within a packet header. As known, the packet header includes a packet identifier, i.e., a PID, which is used to reassemble the original components of the stream of data, i.e., video, audio, etc. Included in the packet parser 13 is a PID filter 14 which functions to filter out the unnecessary packets from the input multiplex stream and pass through only those packets associated with the desired data, e.g., video or audio program, for example. Additionally, the packet parser extracts program clock references (PCRs) and sends them to a clock recovery unit 19 for reconstructing a System Time Clock (STC).

From the PID filter 14, the desired packets may be optionally input via an interface 16 to a descrambler device 16a which may be implemented for conditional access reasons. The data may then be transferred to an auxiliary port 17 for exit as a real-time stream 40, i.e., the data that arrives at the front end 15 leaves the front end at the same rate. The difference however, is that the output is reduced to only the packets that are of interest for communication on a real-time basis.

As described in commonly-owned, co-pending U.S. patent application Ser. No. 09/730,636 entitled SYSTEM AND METHOD FOR REMULTIPLEXING OF A FILTERED TRANSPORT STREAM, the output stream is additionally input to a packet loader device 18 which may transport the packets through the buffer control device 25 for loading into a packet buffer 21, which may be a ten (10) packet bucket, for example. As mentioned, the PID filter 14 enables retention of only the packets of interest however, this data has not been separated. Preferably, a key word or an information word has been is associated with each packet which identifies the packet as either audio, video or data headed for system memory. Thus, loaded into the packet buffer are all the packets of interest with each packet having an information word appended thereto indicating the payload and dictating the subsequent processing to be performed by the video, audio and data unloaders. This processing includes transferring packets associated with one program, e.g., audio data, video data and navigation/system data associated only with that program, in a "bucket queue" memory for subsequent access including decoding and playback. That is, the special controls in the data loader 28 and the buffer control 25 enable the video, audio and system data to be stored together in one place, the bucket queue, rather than separate places. More particularly, as described in co-pending U.S. patent application Ser. No. 09/730,636, the transport demultiplexor 10 of FIG. 1, provides a queue remux component 100 which performs a packet insertion function enabling new data content to be subsequently inserted for storage in the bucket queue that was not in the original stream. As shown in FIG. 1, this queue remux component 100 is provided as part of the data unloader module 28.

In accordance with the present invention, the alternative to remultiplexing new data content for programs that are to be stored in a bucket memory for subsequent access, is to remultiplex ("remux") new data content into the partial transport stream to be communicated on a real-time basis. Since the stream 40 maintains its real-time characteristics, there is no inherent way to directly insert new packets, i.e., the CPU does not have time to be able to go in and add new content. However, due to the filtering out of unnecessary content by the demultiplexor PID filter 14 which removes packets in their entirety, there are gaps created in the original transport stream which may be inserted with new data content without delaying or negatively affecting the real-time stream in any way. Thus, according to the preferred embodiment of the invention, a signaling mechanism is provided that is generated by the auxiliary port 17 that informs a multiplexer component where the gaps exist so that data may be inserted therein. Since packets are of fixed size, e.g., 188 bytes there is guaranteed to be sufficient space to insert a full packet's worth of new data content in these gaps or openings. Further, in accordance with the invention, a FIFO buffering function is provided that enables new packet data to be queued for insertion in the stream, and multiplexed into it when an empty packet slot is indicated.

It is understood that, the auxiliary port 17 depicted in FIG. 1, is compatible with the input port of real-time network transmission device such as a 1394 link controller (not shown) that includes support for the IEC61883 standard, for example. In order to provide real-time packet insertion, the first component of the invention comprises the addition of a new Remux Buffer block 50 connected between the demultiplexor auxiliary port 17 and the 1394 real-time transmitter. As will be described in greater detail, the Remux Buffer block 50 includes a staging buffer component 52 that has a direct interface to system memory and is configured to retrieve a given number of packets that have been created by a processor and placed at a certain address in memory. The Remux Buffer block particularly fetches new packet data until the staging buffer is filled. As is understood, this must constitute at least one full packet worth of data in order to prevent starting to load a packet in a gap and not being able to complete fetching the data from memory in time.

More particularly, as shown in FIG. 1, the real-time Remux Buffer block is a logic device 50 comprising a data multiplexor block 51, the remux (staging) buffer 52 (1394 Remux Buffer), and a PLB (Processor Local Bus) interface (IF) 53. The remultiplexor logic device 50 essentially receives new data content, e.g., pre-fabricated data built ahead of time by the CPU, from system memory, without CPU intervention, via the PLB/IF interface 53. The new content is queued up in the staging buffer 52 within the logic block. The auxiliary port sends a signal indicating where the gap exists in the transport stream. In response, the multiplexor block 51 moves the new data from the staging buffer (1394 remux buffer 52) and inserts the new data in the transport stream at the indicated gap. Simultaneously, the staging buffer is refilled directly from system memory.

Figure 2:
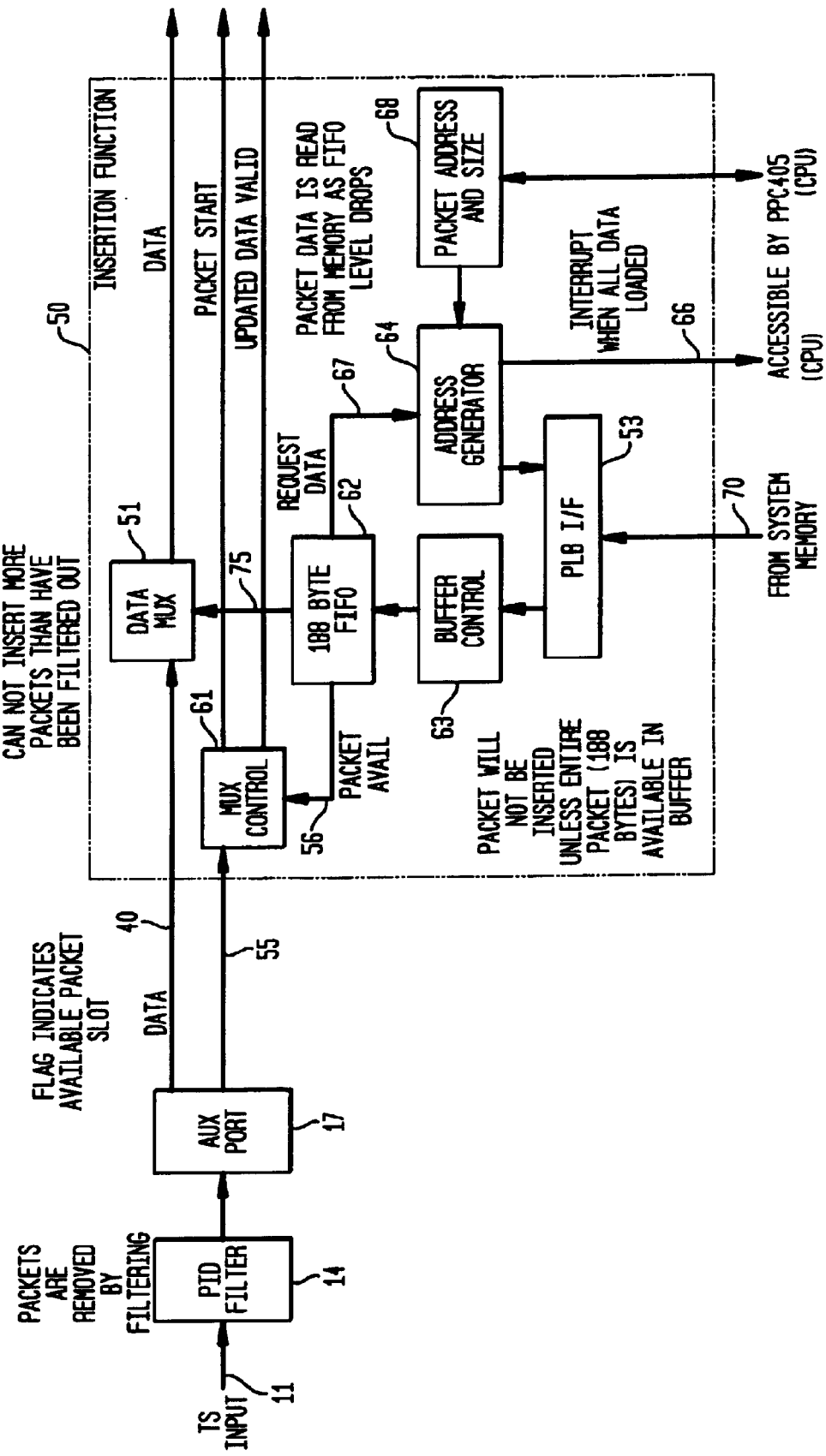
FIG. 2 illustrates a detailed block diagram depicting the data flow operations for the real-time data remux component 50 according to the invention.

Referring in greater detail to FIG. 2, the original transport stream 11 is input to the demultiplexor where the PID filter 14 pulls out only the packets cared about. Particularly, the auxiliary port generates two (2) pieces of information, including: 1) the partial transport data stream itself 40; and, 2) a gap indicator flag 55 for indicating the presence of a valid gap in the transport stream at the location(s) where a packet has been filtered out. The gap indicator flag 55 provides a guarantee that there is 188 bytes space in the transport stream and ensures that a packet will not be inserted unless the entire packet (188 bytes) is available in the buffer. As it is a requirement that no more packets be inserted in the stream than are removed by the demultiplexor filtering operation, the Mux control block 61 receives the gap indicator flag 55 from the auxiliary port and additionally receives a flag 56 indicating from the staging buffer indicating whether or not there is a packet's worth of available new data in the staging buffer for input to the stream at the gap location. This mechanism ensures that the correct amount of new data will be input to fit the detected gap location.

The staging buffer particularly includes a 188 byte storage tank or first-in-first-out (FIFO) unit 62 which stores the new available data for immediate insertion into a determined gap of the transport stream as the real-time stream 40 is going by. A mechanism for keeping the FIFO buffer 62 full is provided which includes buffer control 63, address generator 64, and, the PLB interface 53 components. The buffer control device 63 and address generator 64 include devices retrieving the packets to be inserted directly from the system memory in accordance with a direct memory access protocol, and loading of the packets in the FIFO 62. That is, in response to a data request 67 from the FIFO 62, data is pulled directly from system memory so that when the FIFO starts to get empty during a packet insertion operation, more new data may be retrieved for re-filling the buffer. In this manner, continuous packets (or large data blocks) stored in memory may be inserted in the stream, if the transport stream permits. As shown in FIG. 2, the CPU interfaces with the logic block 50, and only functions to inform the logic components 68 where that data to be inserted is, and how many packets there are. Particularly, information including the packet address in system memory where the packet data 70 to be inserted is, and its size 68, i.e., how many bytes the data to be inserted comprises, are communicated to the address generator block 64. This is because the CPU has constructed ahead of time the data packets to be inserted, and stores these in the system memory. Via a direct memory access protocol, the address generator and buffer control blocks cooperate to control retrieval of the data bytes directly from system memory and inserts these in the buffer. As further shown in FIG. 2, the address generator performs address generation for the next packet to be loaded in the FIFO and additionally, generates an interrupt 66 to the CPU when all data is loaded, i.e., when the remultiplexor function 50 has consumed all of the data. The data 75 stored in the FIFO is eventually inserted in the partial transport stream 40 by the data Mux 51.

According to the invention, the methodology for carrying out the transport demultiplexor queue remultiplexor function includes a first step of configuring the partial transport stream (with gaps) for delivery out of the auxiliary port of the demultiplexor by only indicating a subset of available packets are to be forwarded to the auxiliary port. It should be understood that packets may go to auxiliary port and/or the system memory for eventual reinsertion. Concurrently, or in advance, the CPU is constructing in memory the packet to be inserted. It should be understood that there is no correlation in time between these two events, i.e., these are independent processes. Once these steps are completed, the CPU configures the insertion function by giving the address generator block of the remux buffer the address of the new data and the number of packets for storage in the FIFO. Then logic is implemented for inserting data, at which time an interrupt is issued when all of the available data is loaded. It is understood that timer interrupts may be used for time spacing so that this may be repeated at regular intervals in order to intersperse the new data. That is, a timer interrupt, as is included in an integrated Set-Top chip such as the STB03xxx design, may be set so that packets are inserted on a periodic basis throughout the stream.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. In a transport stream demultiplexor device receiving an input transport stream comprising a plurality of data packets and including a filter device for removing one or more predetermined packets to form a partial transport stream comprising packets of interest, a real-time data remultiplexing system comprising:

mechanism for synchronously detecting in real time, the presence of a gap in said partial transport stream where predetermined packets have been removed and generating a signal indicating said gap location;

a mechanism for directly retrieving packet data having new content from a memory storage device, and storing said retrieved packet data into a staging buffer device for queued storage prior to insertion into said partial transport stream; and, a multiplexor device responsive to said signal for synchronously pulling a queued data packet from said staging buffer device in real time and inserting said pulled packet into said gap as said partial transport stream is being transported on a real-time basis, wherein said retrieving mechanism enables concurrent re-filling of said staging buffer as queued data is pulled from said buffer.

2. The real-time data remultiplexing system as claimed in claim 1, wherein said buffer device comprises a first in first out (FIFO) buffer for storing said new data content.

3. The real-time data remultiplexing system as claimed in claim 1, wherein said buffer device generates a signal indicating availability of new data packet for complete insertion at a gap location.

4. The real-time data remultiplexing system as claimed in claim 1, wherein said staging buffer device generates request signal for input to said retrieving mechanism for initiating direct retrieval of new data packets from said memory storage.

5. The real-time data remultiplexing system as claimed in claim 4, further comprising a processor device and memory storage device for storing new data content to be inserted, said processor device generating address and size information of available new data content to be stored in said buffer device.

6. The real-time data remultiplexing system as claimed in claim 5, further comprising means responsive to said request signal for pulling said data packets from said memory device based on said address and size information.

7. The real-time data remultiplexing system as claimed in claim 6, wherein said means responsive to said request signal includes address generator device for generating addresses in said memory storage where new data content is to be pulled.

8. The real-time data remultiplexing system as claimed in claim 1, further including timer mechanism for periodically creating gaps in said transport stream for periodically inserting new data content in said partial transport stream.

9. The real-time data remultiplexing system as claimed in claim 1, wherein said partial transport stream includes data packets including audio, video and navigation data payloads.

10. In a transport stream demultiplexor device receiving an input transport stream comprising a plurality of data packets and including a filter device for removing one or more predetermined packets to form a partial transport stream comprising packets of interest, a real-time data remultiplexing method comprising:

synchronously detecting in real time, the presence of a gap in said partial transport stream where predetermined packets have been removed and generating a signal indicating said gap location;

directly retrieving packet data having new content from a memory storage device, and storing said retrieved packet data into a staging buffer device for queued storage prior to insertion into said partial transport stream; and, synchronously pulling in real time, a queued data packet from said buffer device in response to said indicating signal and inserting said pulled packet into said gap as said partial transport stream is being transported on a real-time basis; wherein said partial transport stream having new data content is communicated on a real-time basis.

11. The real-time data remultiplexing method as claimed in claim 10, further including the step of enabling concurrent re-filling of said staging buffer as queued data is pulled from said buffer.

12. The real-time data remultiplexing method as claimed in claim 10, further including the step of generating a signal indicating availability of new data packet for complete insertion at a gap location.

13. The real-time data remultiplexing method as claimed in claim 11, further including the step of generating a request signal for initiating direct retrieval of new data packets from said memory storage.

14. The real-time data remultiplexing method as claimed in claim 13, further comprising the step of: generating address and size information of available new data content to be stored in said buffer device.

15. The real-time data remultiplexing method as claimed in claim 14, further comprising the step of: responding to said request signal for pulling data packets from a system memory device based on said address and size information.

16. The real-time data remultiplexing method as claimed in claim 15, wherein said step of pulling data packets from a system memory device further includes the step of generating addresses in said memory storage where new data content is to be pulled.

17. The real-time data remultiplexing method as claimed in claim 10, further including the step of periodically creating gaps in said transport stream for periodically inserting new data content in said partial transport stream.

18. The real-time data remultiplexing method as claimed in claim 10, wherein said partial transport stream includes data packets including audio, video and navigation data payloads.

\* \* \* \* \*